July 10, 1962 J. E. HAYNES, JR 3,043,134
COATED FABRIC FLEXING DEVICE
Filed Oct. 8, 1959 3 Sheets-Sheet 1

INVENTOR.
JAMES E. HAYNES, JR.
BY
ATTORNEYS

July 10, 1962
J. E. HAYNES, JR
3,043,134
COATED FABRIC FLEXING DEVICE
Filed Oct. 8, 1959
3 Sheets-Sheet 2
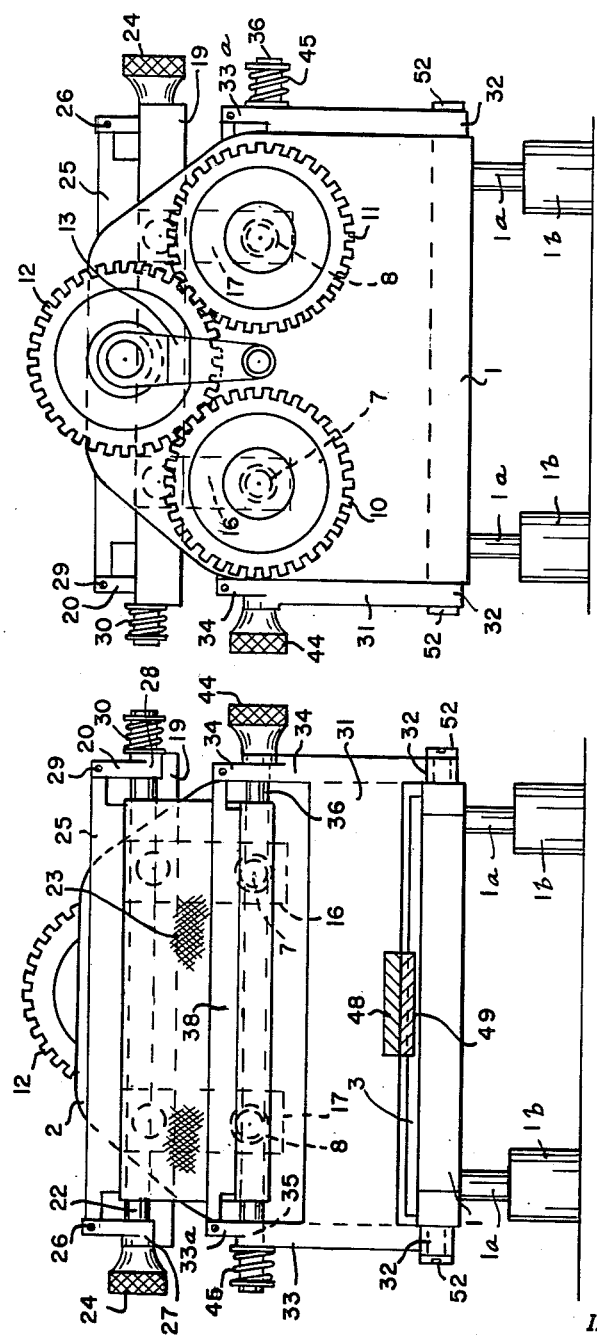
INVENTOR.
JAMES E. HAYNES, JR.
BY
ATTORNEYS

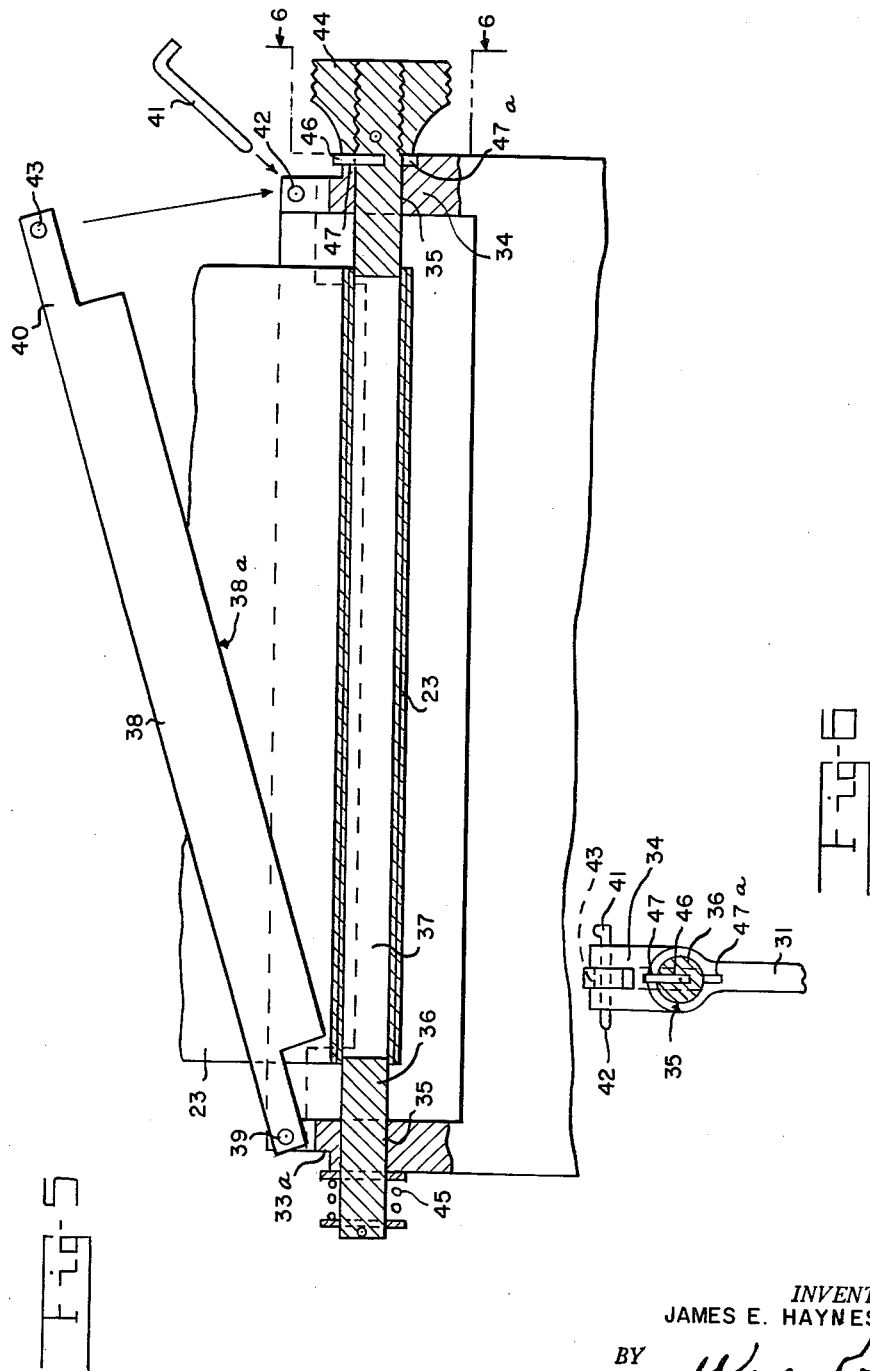

United States Patent Office 3,043,134
Patented July 10, 1962

3,043,134
COATED FABRIC FLEXING DEVICE
James E. Haynes, Jr., Dayton, Ohio, assignor to the United States of America as represented by the Secretary of the Air Force
Filed Oct. 8, 1959, Ser. No. 845,292
8 Claims. (Cl. 73—100)
(Granted under Title 35, U.S. Code (1952), sec. 266)

The invention described herein may be manufactured and used by or for the United States Government for governmental purposes without payment to me of any royalty thereon.

This invention relates to testing apparatus and more particularly to flexing devices for mechanically flexing coated "test" fabric specimens for determining the amount of deterioration between the fabric and the coating which occurs during a specific amount of flexing and distortion of the specimen.

An object of the invention is the provision of a device which can be used in any fabric test procedure where a rumpling type of flexure of a specimen is required.

A further object is the provision of a flexing device which more closely approximates the flexing of a coated fabric in most situations of actual use.

A further object is the provision of a device which alternately flexes a sample of a coated fabric over a large area in two different directions in a plurality of different angularly disposed intersecting planes.

A further object is the provision of means for determining the amount of flaking off of the coating of a coated flexible material or fabric during the testing thereof.

A further object is the inclusion of means for maintaining a wide range of predetermined tension on the opposite sides or ends of a test sample during the flexing thereof by a flexing device incorporating the invention.

A further object is the provision of a coated fabric or material testing apparatus which is simple in construction and operation, low in cost and easily and conveniently portable.

A more specific object is the provision of an apparatus which imparts a motion to the test fabric which causes the two yarn systems (warp and filling) to distort from their normal dimensions and angular relationship which is more representative of the flexing received by the cloth when worn as a garment than a pure single axis bending which the usual flexing devices impart.

Still more specifically, an object of the invention is the provision of a testing device for testing samples of aluminized coated garments for fire fighting personnel to determine and measure the degree and amount of the flaking and deterioration which occurs in tests involving a predetermined number of flexings.

A further object is the provision of a simple means for mounting test specimens in a predetermined flat plane having a substantial predetermined area and means for securely clamping the test specimen along its opposite ends on a pair of spaced winding rollers, and means for moving one of the winding rollers axially back and forth and simultaneously moving that roller laterally through a plurality of parallel positions relatively to the other roller.

Other objects and advantages of the invention will become apparent from the following description and accompanying drawings in which like reference characters refer to like parts in the several figures of the drawings.

Drawings

FIG. 3 is a vertical sectional view taken about on the plane indicated by line 3—3 in FIG. 2, looking in the direction of the arrows;

FIG. 4 is an end view looking toward the operational end of the tester;

Figure 1:
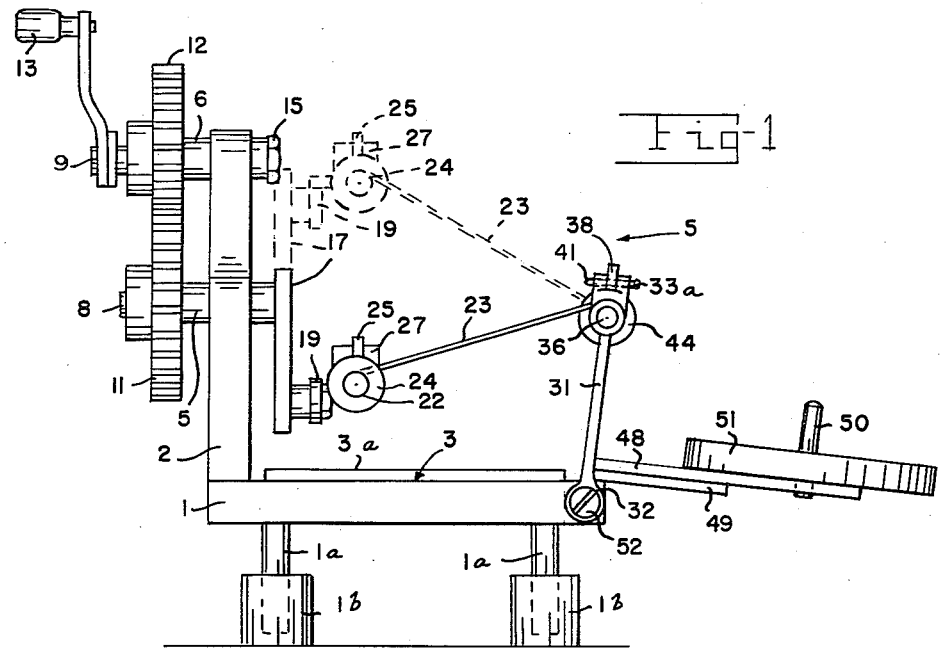
FIG. 1 is an elevational side view of the improved coated fabric testing device, showing a sample in full lines in one position and in dotted lines when flexed to another position.

FIG. 5 is a somewhat enlarged fragmentary detailed sectional view illustrating the mounting means for one edge of the coated fabric samples, parts being broken away and shown in section, the view being taken about on line 5—5 of FIG. 1 and showing the fabric clamping bar raised in dotted lines; and FIG. 6 is a transverse detailed sectional view taken about on line 6—6 of FIG. 5 illustrating the locking pin and noted arrangement for aligning the fabric clamping bar or lever with either side of the elongated slot in the fabric winding roller.

Referring to the drawings the reference numeral 1 denotes a base plate or support having a vertically disposed end plate 2 and providing a horizontal plate supporting surface 3.

Figure 2:
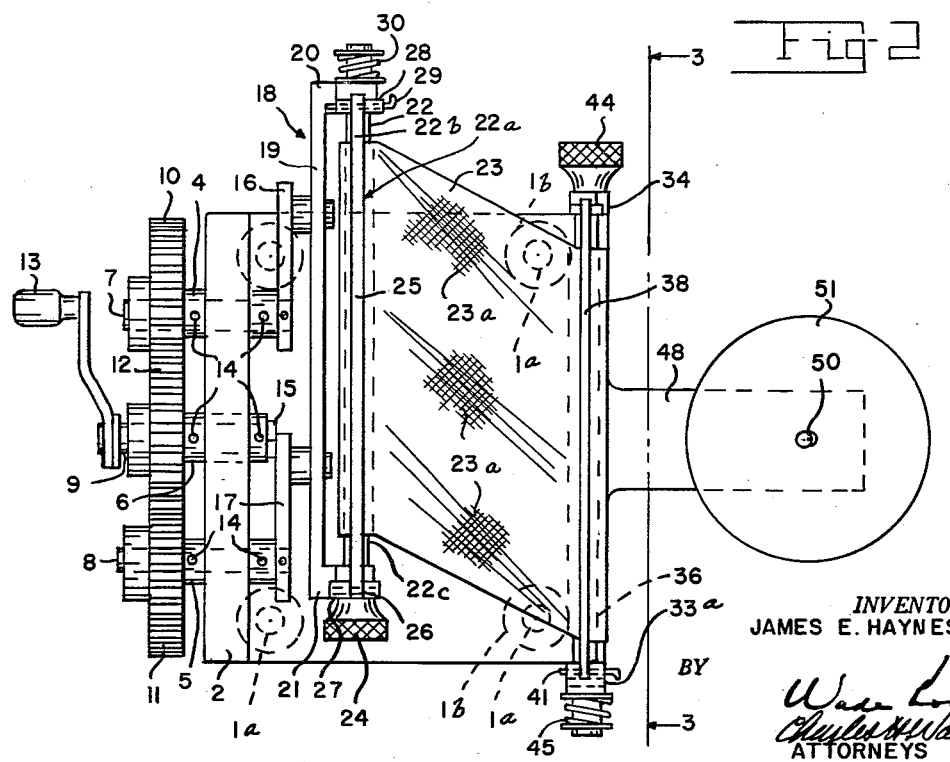
FIG. 2 is a top plan view of the testing device showing a test sample flexed in another position and direction.

In the vertical end plate 2 are disposed three equally spaced apart journal bearings 4, 5 and 6, best seen in FIG. 2, in which are journalled shafts 7, 8 and 9 on which are fixed meshing gears 10, 11 and 12. The shaft 9 is a drive shaft and carries an actuating crank 13 for rotating the gear 12, which in turn rotates the gears 10 and 11 and shafts 7 and 8 at the same rates of rotation, suitable oil holes 14 are provided as shown for lubricating purposes. All three shafts 7, 8 and 9 extend through and beyond the bushings 4, 5 and 6 and the shaft 9 has a retainer nut 15 screwed thereon.

The shafts 7 and 8 each have similar crank arms 16 and 17 pinned thereon to which is pivoted an elongated fabric supporting means or cross head 18.

As shown the drive gear 12 and driven gears 10 and 11 are the same diameter so that one rotation of the crank 13 produces one rotation of the two crank arms 16 and 17 and one rotation gyration of the fabric supporting means 18.

If desired the shaft 9 may be power driven at some predetermined speed, also one of the crank arms 16 or 17 may be made longer than the other to provide a cross head motion which is not necessarily parallel to the top supporting surface 3 of the base plate 1.

The cross head 18 comprises an elongated plate or bar 19 having forwardly extending extensions or ends 20 and 21 in which is rotatably journalled a first slotted fabric supporting or clamping roller 22 substantially identical in construction to the roller shown in FIG. 5. The roller 22 is both rotatably and slidably journalled in suitable bearings in the forward extensions and is diametrically slotted clear through at 22$^a$ from point 22$^b$ and point 22$^c$ near the extensions 21 and 22 to receive one end of the coated fabric sample 23 therethrough, after which the roller is rotated by the knob 24 to obtain a wrap or two of the sample around it. The outer surface of the forward extension 21 is provided with diametrically disposed vertical notches at opposite sides of the roller 22 and the roller is provided with a radially projecting short pin adapted to engage either of the notches when the elongated slot 22$^a$ is disposed directly under a clamping blade 25, which is pivoted at 26 to a bifurcated vertical extension 27 on the extension or arm 21. The lower edge of the clamping bar 25 is slightly narrower than the width of the slot 22$^a$ so as to enter the slot and securely clamp the sample 23 to that roller 22. The extension 20 has a similar upwardly extending bifurcated extension or arm 28 for receiving the narrowed end of the clamping blade 25, suitable alignable apertures being provided in the arm 28 and the end of the bar 25 through which a locking pin 29 is passed to lock the clamping bar 25 down in place.

With the bar 25 raised, similar to the bar shown in dotted lines in FIG. 5, a pull on the knob 24 will slide the roller axially to disengage the locking pin under the knob 24 from the notches in the extension, after which the roller may be rotated to remove or tighten the fabric coated sample 23 thereon.

The opposite end of the roller 22, beyond the forward extension 20 is provided with a compression coil spring 30 which provides a yieldable axial tension on the roller as shown, always tending to pull the knob 24 against the extension 21 and engage the radial locking pin with one or the other of the notches when one or the other of the notches are aligned therewith.

In order to provide a substantially uniform or predetermined tension on the coated fabric sample 23 during testing and while the crank 13 is being rotated a second or front roller shaft 36 similar to the roller 22 is provided, and shown in detail in FIGS. 3, 5 and 6.

A pivoted roller supporting plate 31 is provided, as seen in FIG. 3, having downwardly extending pivot arms 32 which are suitably pivoted to the forward end of the base plate 1 at opposite sides thereof in a plane parallel to the plane of the vertical plate and parallel to the plate or bar 19 of the cross head 18.

This pivoted plate 31 is cut away to materially clear the top surface of the base plate 1 and is provided with upwardly extending arms 33 and 34 which, like the arms 27 and 28, are provided with journal bearings 35 to rotatably and slidably receive the second coated fabric securing member or roller 36. The roller 36, as seen in FIG. 5, is slotted clear through diametrically as indicated at 37 to receive the other end or edge of the coated fabric sample 23 therethrough after which the roller is rotated a turn or two and a clamping blade 38, similar to the blade 25, which is pivoted at 39 between the bifurcated upward extension 33ª is moved downwardly into the slot 37 and the outer end 40 is pinned in position by a pin 41 passed through the apertures 42 and 43, locking the clamping bar member 38 down with the lower edge 38ª clamping the fabric sample in place across the slot 37.

The roller 36 has an operating knob 44 pinned thereon at one end and a compression spring 45 between washers, tensioning the roller, as shown in FIG. 5, to the left to draw the knob 44 against the outer side of the extension 34. The roller 36, directly under the head of the knob 44, is provided with a short radial pin 46 disposed to seat in one or the other of two diametrically opposite locking notches 47 and 47ª when the knob 44 is drawn up against the outer side of the extension 34 by the spring 33, thus aligning the opening of the slot 37 directly under the lower edge 38ª of the clamping blade member or lever 38.

The pivoted supporting plate 31 is provided with a laterally extending weight supporting arm or plate 48 or tensioning means reinforced at 49 and being a vertical weight retaining standard 50 on which is positioned a weight element 51. As shown, this weight element 50 is in the form of a circular flat disk, preferably of lead, having a central hole through which the standard 50 extends, holding the weight on the arm 48 at a predetermined distance from the pivots 52. The weight of the disk 51 can be varied as desired, but should be of some predetermined weight selected for the tests, for instance 2 lbs.

In the operation of the device a sample such as 23 of a coated fabric that it is desired to test; for instance, an aluminized coated fabric such as used in fire fighter clothing is cut, preferably in rectangular shape, having a length sufficient to wrap a turn or two around each of the rollers 22 and 36 and extend between the upper sides of the rollers, the width of sample 23 being about equal to or slightly less than the length of the slots 22ª and 37 in the roller members.

The two clamping blades 25 and 38 are raised and the opposite ends of the sample 23 are inserted in the slots, after which the knobs 24 and 44 are pulled outwardly to disengage the locking pins from the notches in the extensions 21 and 34.

The two rollers are now rotated preferably with the cross head 18 in the position shown in FIG. 3, until the pivoted tensioning plate member 31 assumes an almost vertical position. The pull on the knobs 24 and 44 can now be relieved and the rolls or rollers 22 and 36 turned until the radial pins thereon drop into the provided diametrically opposite notches, thus locking the rolls with the slots therein in alignment to receive the clamping blades 25 and 38. The blades 25 and 38 are now lowered to clamp the sample 23 on the rolls 22 and 36.

If it is desired to measure or determine the amount of the "flaking off" of the coating of a coated fabric a sample of the fabric with coating is placed facing downwardly, toward the upper surface of the base plate 1 and a collection card or tray 3ª is placed on the surface 3 directly below the sample 23.

After the sample 23 is securely clamped on the roller members as indicated above the hand crank 13 is given a predetermined number of turns. The cranks 16 and 17 oscillate the cross head 18 and roller 22 back and forth relative to the roller 36 and simultaneously up and down in a single plane normal to the base plate 1 thus flexing or rumpling the material in opposite directions as shown in FIGS. 1 and 2 to most closely simulate the flexing and rumpling encountered by the fabric in actual use and produces a distortion of the fabric and movement of the yarns out of their normal orientation to one another. After a specific test, involving a specific number of turns of the crank with a predetermined application of end tension applied to the sample by the use of a predetermined weight member 51 there will probably be a certain amount of flaking of the coating on the lower side of the fabric sample. This flaking will drop onto the card 3ª (or into a tray, if a tray is employed instead of the card). These flaking particles can be counted, or in the case of a tray, can be weighed, and by making similar tests on a plurality of fabric samples it can easily be determined which is the best material, least subject to damage and/or flaking by the distortion of the fabric during the tests.

In FIG. 2 the transverse angular wrinkles due to the distortion of the sample in one direction are indicated schematically at 23ª. Of course, when the cross head is shifted to the opposite end of its stroke the wrinkles will be in a substantially transversely inclined relation to the wrinkles 23ª.

The device, as shown, is convenient and portable, and should be firmly supported during rotation of the crank 13. As shown, the base 1 is supported on short legs 1ª on which may be fitted rubber feet 1ᵇ.

While there has been shown and described herein above the preferred embodiment of this invention, it is to be understood that the invention is not limited thereto and that various changes, alterations and modifications can be made without departing from the spirit and scope thereof as defined in the appended claims wherein I claim:

1. Apparatus for testing a flat sample of pliable coated sheet material comprising a main support, a pair of transversely spaced substantially parallel elongated fabric clamping members for clamping the entire opposite side edge portions of a sample of the coated sheet material therebetween, means on said support for moving a first one of said elongated fabric clamping members simultaneously longitudinally back and forth and up and down in a rotative gyratory motion in one plane in parallel oriented relation to the other clamping member, means connected to said other of said elongated clamping members and the support for tensioning the last mentioned elongated clamping member in a plane transverse to the plane of said back and forth and up and down direction of movement of the first elongated coated fabric clamping member, and removable collection means carried by said support below and between said transversely spaced elongated fabric clamping members for collecting particles of the coating of the coated sheet material which fall from the coated sheet material during the combined back and forth and up and down movement of said first elongated coated fabric clamping member.

2. A coated fabric testing device for testing a substantially rectangular flat sample of coated fabric of a predetermined area to determine the degree of flaking of the coated material therefrom, comprising a pair of elongated parallel transversely spaced fabric tensioning rolls including means thereon for securing the opposite edge portions of the sample of the fabric to be tested between said rolls with the coated material facing downwardly, means between the support and a first one of said rolls for reciprocating said first roll back and forth longitudinally and simultaneously up and down in a rotary gyratory motion relative to the second of said rolls in a plane at an angle to the plane of a coated fabric material sample when secured to said rolls, means carried by said support for supporting said second roll for movement toward and away from said first roll in a plane transverse to the back and forth and up and down direction of movement of said first roll, transverse tensioning means for tensioning said second roll in a direction away from said first roll and a flaking collection means having a predetermined collection area carried by said support in a substantially horizontal plane below said rolls for collecting the flaking particles from the coating of a coated fabric when secured between said rolls when said first roll is reciprocated back and forth and up and down relative to the second roll while transverse tension is applied by said tensioning means to the second roll to the tension the second roll in a direction away from said first roll.

3. A device for testing the durability of a rectangular shape flat coated sheet fabric sample against flaking, comprising a support, a first elongated clamping means for clamping the fabric sample along one edge thereof in a substantially horizontal plane, actuating means between the support and said first clamping means for reciprocating said first clamping means back and forth and simultaneously up and down in a predetermined plane at an angle to the plane of the sample, a second elongated clamping means for clamping the fabric sample along its opposite edge in a substantially horizontal plane in transversely spaced parallel relation to the first elongated clamping means, tensioning means between said support and said second clamping means tensioning said second clamping means in a direction transversely away from said first clamping means, said support having a substantially horizontal supporting surface disposed under the space between said first and second clamping means.

4. A coated fabric testing device comprising a horizontal supporting plate having front and rear parallel edges, a vertical mounting plate extending upwardly from the back edge of said horizontal supporting plate, a pair of horizontally spaced parallel crank shafts journaled in and extending through said vertical mounting plate in equally spaced relation above said horizontal supporting plate, a drive shaft journalled in said mounting plate in spaced parallel relation to said crank shafts, drive means between said drive shaft and said crank shafts for rotating said crank shafts at a predetermined rate of rotation in the same direction relative to the rates of rotation of said drive shaft, an elongated cross head pivoted to both of said cranks of said crank shafts for combined simultaneous reciprocation and upward and downward movement in parallel relation to said horizontal supporting base plate, a longitudinally slotted fabric receiving roller journalled at its opposite ends to said cross head in parallel relation to said supporting plate for receiving one edge portion of a flat rectangular sample of a coated flexible fabric to be tested therethrough, a fabric clamping blade pivoted at one end to one end of said cross head and disposed above said slot to enter the slot and clamp the edge of the sample to said roller at opposite sides of said slot, means at the other end of said cross head for locking said clamping blade in clamping position in the slot, a fabric tensioning means comprising an elongated fabric tensioning plate pivoted at its opposite ends to the front end of said horizontal supporting plate at opposite sides thereof on an axis parallel to said vertical mounting plate and said horizontal supporting plate, said tensioning plate extending upwardly away from said horizontal supporting plate, a second longitudinally slotted fabric receiving roller journalled on the upper end of elongated fabric tensioning plate on an axis parallel to the axis of the first mentioned longitudinally slotted fabric receiving roller for receiving therethrough the opposite edge portion of the flat rectangular sample of the coated flexible fabric to be tested, a second fabric clamping blade pivoted at one end to the upper edge portion of said fabric tensioning plate at one end thereof and disposed above the slot in the second longitudinally slotted fabric receiving roller to enter the slot in that roller and clamp the opposite edge of the sample to said second roller at opposite sides of said slot therein and to the upper end of said fabric tensioning plate, means at the other end of said second clamping blade for locking that blade in clamping position, means connected to said pivoted fabric tensioning plate for tensioning said pivoted fabric tensioning plate in a direction away from the first fabric clamping roller to apply tension to one edge of the sample while reciprocating the other edge of the sample perpendicular to the direction of the tension.

5. Apparatus as set forth in claim 4, including a horizontal collection surface on the upper side of said horizontal supporting plate and below the sample for collecting particles of the coating of the sample which become dislodged during the edgewise movement and simultaneous up and down movement of one edge of the sample while maintaining transverse tension to the other edge of the sample.

6. A sheet fabric flexing and testing apparatus comprising a support, elongated first and second spaced clamping means movably carried on said support in spaced parallel relation to each other for clamping therebetween the opposite parallel side edges of a sample of sheet fabric in a substantially flat plane, a pair of spaced cranks carried by said support connected directly to said first clamping means in spaced relation to each other, means for rotating said cranks in unison in the same direction for moving said first clamping means in parallel oriented relation in a rotative gyratory back and forth and up and down motion in one plane, and means pivoted to said support for tensioning the second elongated clamping means in a direction away from the first elongated clamping means during said rotary gyratory movement of said first elongated clamping means.

7. A sheet fabric flexing and testing apparatus comprising a main support, first and second elongated fabric clamping means movably carried by said support in spaced parallel relation to each other for clamping the opposite parallel side edges of a sample of sheet fabric to be tested in a substantially flat plane, a pair of spaced parallel crankshafts journalled in said support perpendicular to said elongated fabric clamping means, a crank fixed to each shaft for rotation of both cranks in similar oriented relation in a common plane disposed at a substantial angle to said flat plane, means pivotally connecting said first elongated clamping means to both of said cranks in spaced relation to each other for rotative gyratory motion thereof in fixed parallel oriented relation, a drive shaft intermediate said crankshafts, gear means between said driveshaft and said crankshafts for rotating both of said crankshafts in unison in the same direction at the same rate of rotation, and means carried by said support for tensioning said second fabric tensioning means in a direction substantially normal to the plane of rotative gyration of said first fabric tensioning means during rotation of said crankshafts.

8. A sheet fabric flexing and testing apparatus comprising a support, a pair of elongated fabric clamping rolls movably carried by said support in spaced parallel relation to each other for clamping the opposite parallel side edges of a rectangular sample of flexible coated fabric therebetween to be flexed and tested, means for moving a first one of said rolls in parallel oriented relation to the first elongated clamping roll in a rotary gyratory path in a plane disposed in angular intersecting relation to a plane through the axes of both of said clamping rolls, and tensioning means between the other clamping roll and said support for tensioning said other roll for movement thereof in a direction away from said first clamping roll to tension the fabric when clamped between said rolls in the plane of the fabric during the rotative gyration of said first clamping roll.

References Cited in the file of this patent

UNITED STATES PATENTS

| | | |
|---|---|---|
| 1,678,017 | Midgley | July 24, 1928 |
| 2,007,286 | Schopper | July 9, 1935 |
| 2,657,573 | Castricum | Nov. 3, 1953 |
| 2,670,627 | Shaw | Mar. 2, 1954 |
| 2,709,915 | Conti | June 7, 1955 |
| 2,917,921 | Neher | Dec. 22, 1959 |